(12) United States Patent
Honda et al.

(10) Patent No.: US 12,719,106 B2
(45) Date of Patent: Aug. 25, 2026

(54) PARTITION MEMBER AND ASSEMBLED BATTERY

(71) Applicant: Mitsubishi Chemical Corporation, Chiyoda-ku (JP)

(72) Inventors: Tatsuhiko Honda, Chiyoda-ku (JP); Tomohiro Kawai, Chiyoda-ku (JP); Naoto Maru, Chiyoda-ku (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 16/882,947

(22) Filed: May 26, 2020

(65) Prior Publication Data

US 2020/0287256 A1 Sep. 10, 2020

Related U.S. Application Data

(63) Continuation of application No. PCT/JP2018/044272, filed on Nov. 30, 2018.

(30) Foreign Application Priority Data

Nov. 30, 2017 (JP) ................................ 2017-231169

(51) Int. Cl.
*H01M 10/6555* (2014.01)
*H01M 10/613* (2014.01)
(Continued)

(52) U.S. Cl.
CPC ..... *H01M 10/6555* (2015.04); *H01M 10/613* (2015.04); *H01M 10/625* (2015.04);
(Continued)

(58) Field of Classification Search
CPC ......... H01M 10/6552; H01M 10/6569; H01M 10/6555; H01M 10/613; H01M 10/625;
(Continued)

(56) References Cited

U.S. PATENT DOCUMENTS

2006/0267545 A1* 11/2006 Lee ..................... H01M 50/209 320/106
2007/0292751 A1* 12/2007 Cherng ............... H01M 10/659 429/185

(Continued)

FOREIGN PATENT DOCUMENTS

CN 1176022 A 3/1998
CN 102301503 A 12/2011

(Continued)

OTHER PUBLICATIONS

International Preliminary Report on Patentability and Written Opinion issued Jun. 2, 2020 in PCT/JP2018/044272 (English Translation only), 6 pages.

(Continued)

*Primary Examiner* — Miriam Stagg
*Assistant Examiner* — Lilia Nedialkova
(74) *Attorney, Agent, or Firm* — Oblon, McClelland, Maier & Neustadt, L.L.P.

(57) ABSTRACT

A partition member includes an encapsulated body capable of retaining a liquid and an outer package body having an internal space for accommodating the liquid and the encapsulated body in a sealed state. The ratio of a water absorption rate 2 to a water absorption rate 1, [water absorption rate 2]/[water absorption rate 1], is at least 0.4. The water absorption rate 1 indicates the water absorption rate when the encapsulated body is compressed for 1 minute at a pressure of 0.05 $kgf/cm^2$, and the water absorption rate 2 indicates the water absorption rate when the encapsulated body is compressed for 1 minute at a pressure of 5 $kgf/cm^2$.

13 Claims, 6 Drawing Sheets

(51) Int. Cl.
*H01M 10/625* (2014.01)
*H01M 10/653* (2014.01)
*H01M 10/658* (2014.01)
*H01M 50/204* (2021.01)
*H01M 50/293* (2021.01)

(52) U.S. Cl.
CPC ....... *H01M 10/653* (2015.04); *H01M 10/658* (2015.04); *H01M 50/204* (2021.01); *H01M 50/293* (2021.01)

(58) Field of Classification Search
CPC ............. H01M 10/647; H01M 10/653; H01M 10/658; H01M 50/204; H01M 50/293; H01M 2220/20; Y02E 60/10
See application file for complete search history.

(56) References Cited

U.S. PATENT DOCUMENTS

| | | | | |
|---|---|---|---|---|
| 2009/0061299 | A1 | 3/2009 | Uchida et al. | |
| 2010/0136461 | A1 | 6/2010 | Tsujiko et al. | |
| 2011/0274951 | A1 | 11/2011 | Yasui et al. | |
| 2012/0148895 | A1 | 6/2012 | Fujikawa et al. | |
| 2018/0108959 | A1* | 4/2018 | Kuboki | H01M 10/625 |
| 2018/0351221 | A1 | 12/2018 | Kuboki et al. | |
| 2019/0165436 | A1* | 5/2019 | Kuboki | H01M 10/659 |

FOREIGN PATENT DOCUMENTS

| | | | |
|---|---|---|---|
| CN | 202616368 | U | 12/2012 |
| CN | 105304972 | A | 2/2016 |
| EP | 3 598 566 | A1 | 1/2020 |
| JP | 2000-30533 | A | 1/2000 |
| JP | 2003-303579 | A | 10/2003 |
| JP | 2008-277042 | A | 11/2008 |
| JP | 2009-004362 | A | 1/2009 |
| JP | 2009-054403 | A | 3/2009 |
| JP | 2011-023296 | A | 2/2011 |
| JP | 2013-131428 | A | 7/2013 |
| JP | 2014-072055 | A | 4/2014 |
| JP | 2017-103109 | A | 6/2017 |
| JP | 2017-166748 | A | 9/2017 |
| WO | WO 2010/098067 | A1 | 9/2010 |
| WO | WO 2012/032697 | A1 | 3/2012 |
| WO | WO 2015/029381 | A1 | 3/2015 |
| WO | 2017/051648 | A1 | 3/2017 |
| WO | WO 2017/094821 | A1 | 6/2017 |

OTHER PUBLICATIONS

Extended European Search Report issued Nov. 19, 2020 in corresponding European Patent Application No. 18882695.2, 8 pages.
International Search Report issued Feb. 19, 2019 in PCT/JP2018/044272 filed on Nov. 30, 2018, 1 page.
Indian Office Action issued Mar. 24, 2022 in Indian Patent Application No. 202047026901, 5 pages.
Combined Chinese Office Action and Search Report issued Feb. 18, 2023 in Patent Application No. 201880076446.9 (with English machine translation), 18 pages.
European Office Action issued Nov. 20, 2024 in European Patent Application No. 18882695.2, 7 pages.
European Office Action issued in European Patent Application No. 18882695.2 on Sep. 5, 2025.

* cited by examiner 210
220
200
W(P)
H

PARTITION MEMBER AND ASSEMBLED BATTERY

CROSS-REFERENCE TO RELATED APPLICATION

This application is a continuation application of International Application PCT/JP2018/044272 filed on Nov. 30, 2018 and designated the U.S., and this application is based upon and claims the benefit of priority of the prior Japanese Patent Application No. 2017-231169, filed on Nov. 30, 2017, the entire contents of which are incorporated herein by reference.

BACKGROUND

1. Field

The disclosure relates to a partition member and an assembled battery.

2. Description of the Related Art

The use of secondary batteries as power sources for vehicles and the like has grown dramatically in recent years. Studies are being conducted on further increasing the energy density of secondary batteries, for the purpose of, for instance, increasing the degree of freedom in mounting of a secondary battery in the limited space of a vehicle or the like, and extending the cruising range that can be covered with one charging. On the other hand, a tradeoff tends to arise in secondary batteries between safety and energy density, in that the higher the energy density of the secondary battery, the lower the safety of the battery tends to be. For instance, in secondary batteries mounted on electric vehicles with a cruising range of several hundred km, the surface temperature of the battery in the case of damage to the battery, for instance, due to overcharge or internal short-circuits, may exceed several hundred degrees C., and may reach about 1000° C.

Since a secondary battery used as a power supply of a vehicle or the like is generally used as an assembled battery made up of a plurality of unit batteries (hereinafter, also referred to as "cells"), when one of the unit batteries constituting the assembled battery is damaged and reaches the temperature range described above, there is a risk that the heat generation may damage adjacent unit batteries and the damage may spread in a chain reaction across the entire assembled battery. In order to prevent such a chain of damage among unit batteries, various techniques are being proposed, including providing a partition member between one unit battery and another to quickly move heat from a unit battery at which abnormal heat generation had occurred to a nearby unit battery and to cool a damaged unit battery.

For example, in order to cool a battery that generates an abnormal amount of heat, there exists a cooler-equipped battery in which a secondary battery is arranged so as to be in contact with a cooling container in which a film-like porous body and a cooling liquid are sealed (for example, see PTL 1). In addition, there exists a secondary battery module in which a fluid-containing encapsulated body, in which a fluid having a fire extinguishing effect is tightly sealed, is arranged between a module outer package body and a flat secondary battery (for example, see PTL 2). In addition, there exists an assembled battery in which a filling agent having fire-extinguishing capability is filled in cavities of a spacer between batteries and the spacer splits as a result of heat, thereby allowing the filling agent to flow out of the spacer (for example, see PTL 3). In addition, there exists a battery module containing a heat-absorbing member that encloses a heat-absorbing agent including a liquid or a gelatinous fluid (for example, see PTL 4). In addition, there exists a battery module in which an easy-to-open portion is provided in a part of a sealed portion formed by sealing a sheet-like member, and the easy-to-open portion opens when a single battery generates an abnormal amount of heat (for example, see PTL 5). In addition, there exists a cooling member which is provided with a refrigerant sealed in the interior of a seal body and a medium which is placed in the seal body and through which the refrigerant moves in the seal body, wherein an evaporation region is provided in the medium, a condensation region is provided in the seal body, and the medium is provided with a promoting means for promoting the movement of the refrigerant to the evaporation region (for example, see PTL 6). Furthermore, there exists a battery module in which a plurality of battery cells are arranged at prescribed intervals between a pair of end plates arranged opposite each other at a prescribed interval, wherein a spacer, which has a large number of granular bodies accommodated movably in a packaging body, is arranged between battery cells (for example, see PTL 7).

[PTL 1] Japanese Patent Application Publication No. 2013-131428

[PTL 2] Japanese Patent Application Publication No. 2003-303579

[PTL 3] Japanese Patent Application Publication No. 2009-004362

[PTL 4] WO 2010/098067

[PTL 5] WO 2012/032697

[PTL 6] Japanese Patent Application Publication No. 2017-166748

[PTL 7] Japanese Patent Application Publication No. 2014-072055

SUMMARY

In some cases, a plurality of secondary batteries that constitute an assembled battery are accommodated in a housing in a state whereby, for example, the secondary batteries are arranged in the thickness direction and pressure is exerted in the thickness direction. In such a case, pressure is also exerted on a partition member sandwiched between secondary batteries or to a partition member arranged between a secondary battery and a member other than the secondary battery. It is known that secondary batteries expand when charged and discharged and also when exposed to high temperatures. In such cases, further pressure is exerted on a partition member.

As a result of repeated investigations, the inventors of the present invention found that in cases where a partition member is configured so as to accommodate a liquid and an encapsulated body capable of retaining the liquid, if the encapsulated body is compressed and deformed by pressure, problems can occur, such as the retaining capacity of the liquid by the encapsulated body decreasing and the thermal conductivity of the partition member decreasing.

The purpose of an embodiment of the present invention is to provide a partition member which exhibits good thermal conductivity even if pressure is exerted, and an assembled battery obtained using the partition member.

As a result of detailed investigations, the inventors of the present invention found that the problems mentioned above could be solved by using a partition member that includes an encapsulated body capable of retaining a liquid, a liquid, and an outer package body that accommodates these, wherein an encapsulated body having a water absorption rate that satisfies specific conditions is used as the encapsulated body. That is, the gist of embodiments of the present invention is as follows.

[1] A partition member that forms a partition between single batteries that constitute an assembled battery or between a single battery and a member other than the single battery, wherein the partition member includes an encapsulated body capable of retaining a liquid and an outer package body having an internal space for accommodating the liquid and the encapsulated body in a sealed state, and the ratio of a water absorption rate 2 to a water absorption rate 1, [water absorption rate 2]/[water absorption rate 1], is at least 0.4, where the water absorption rate 1 indicates the water absorption rate when the encapsulated body is compressed for 1 minute at a pressure of 0.05 $kgf/cm^2$, and the water absorption rate 2 indicates the water absorption rate when the encapsulated body is compressed for 1 minute at a pressure of 5 $kgf/cm^2$.

[2] The partition member according to [1], wherein the encapsulated body is formed from a material that contains a porous body.

[3] The partition member according to [2], wherein the porous body contains a fibrous substance and/or particles.

[4] The partition member according to any one of [1] to [3], wherein the outer package body is a laminated body of a metal foil and a resin.

[5] The partition member according to [4], wherein the metal foil is at least one type selected from an aluminum foil, a copper foil, a tin foil, a nickel foil, a stainless steel foil, a lead foil, a tin-lead alloy foil, a bronze foil, a silver foil, an iridium foil and phosphor bronze.

[6] The partition member according to [4] or [5], wherein the resin is a thermoplastic resin.

[7] An assembled battery that includes a plurality of single batteries and the partition member according to any one of [1] to [6].

One of aspects of the embodiment of the present invention is an assembled battery comprising a plurality of single batteries and the partition member.

According to the embodiment of the present invention, it is able to provide that a partition member which exhibits good thermal conductivity even if pressure is exerted, and an assembled battery obtained using the partition member.

DESCRIPTION OF THE PREFERRED EMBODIMENT

Figure 1:
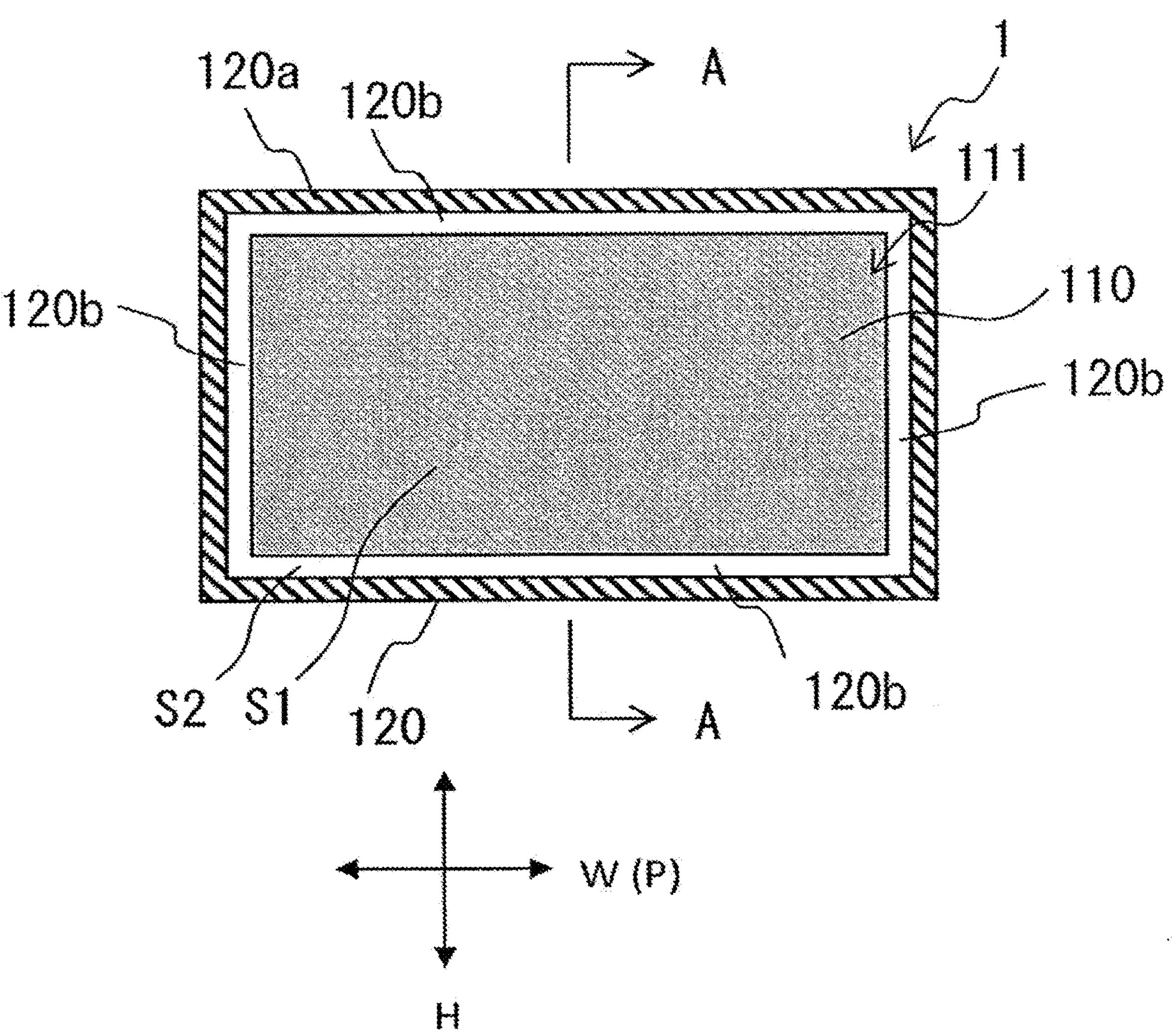
FIG. 1 shows an example of a configuration of the partition member of the embodiment of the present invention.

Embodiments The present invention will now be explained. Explanations of embodiments shown in the drawings below are merely exemplary, and the embodiment of the present invention is not limited to these configurations.

The partition member of the embodiment of the present invention forms a partition between single batteries that constitute an assembled battery or between a single battery and a member other than the single battery, wherein the partition member contains an encapsulated body that can hold a liquid and an outer package body having an internal space that accommodates the liquid and the encapsulated body in a sealed state, and the ratio of a water absorption rate 1, which indicates the water absorption rate when the encapsulated body is compressed for 1 minute at a pressure of 0.05 $kgf/cm^2$, and a water absorption rate 2, which indicates the water absorption rate when the encapsulated body is compressed for 1 minute at a pressure of 5 $kgf/cm^2$ [water absorption rate 2]/[water absorption rate 1] is at least 0.4.

By setting the value of [water absorption rate 2]/[water absorption rate 1] to be at least 0.4, it is possible to obtain a partition member in which the heat conduction performance of the partition member can be maintained even if the partition member is subjected to pressure; and an assembled battery obtained using the partition member. Here, the term "pressure" means pressure caused by a constraining force when a battery is accommodated in a housing or caused by expansion of a secondary battery. A partition member and an assembled battery can be obtained. The upper limit for the value of [water absorption rate 2]/[water absorption rate 1] is not particularly limited, and is generally not more than 1.0, but is preferably not more than 0.9 from the perspective of ease of controlling this value.

Moreover, in order to confirm whether or not the partition member of the embodiment of the present invention satisfies the value for [water absorption rate 2]/[water absorption rate 1], the encapsulated body of the partition member in question should be removed and dried, and the water absorption rate 1 and water absorption rate 2 should be measured. For example, vacuum drying overnight at 90° C. should be used as the drying method.

<Partition Member>

Figure 2:
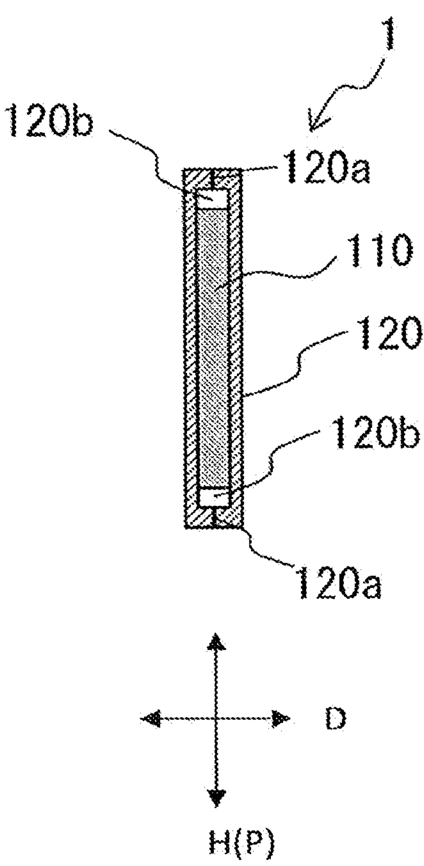
FIG. 2 is a cross-sectional view of a case where the partition member shown in FIG. 1 is cut along the line denoted by A-A.

FIG. 1 shows an example of a configuration of the partition member of the embodiment of the present invention. FIG. 1 shows a frontal view of a partition member 1. FIG. 2 shows a cross section of the right hand side of the partition member shown in FIG. 1, in a case where the partition member is cut along the line denoted by A-A.

In FIG. 1 and FIG. 2, the partition member 1 has an overall plate-like shape or sheet-like shape having a height direction (H), a width direction (W) and a thickness direction (D). The partition member 1 has a thickness direction (D) and a planar direction (P) that is orthogonal to the thickness direction (D). The planar direction (P) includes the height direction (H) and the width direction (W), and a plurality of oblique directions that lie between the height direction (H) and the width direction (W).

The partition member 1 is used to form a partition between single batteries that constitute an assembled battery or between a single battery and a member other than the single battery in the thickness direction (D) of the partition member. The partition member 1 includes an encapsulated body 110 capable of retaining a liquid and an outer package body 120 that accommodates the liquid and the encapsulated body 110 in a sealed state.

[Encapsulated Body]

The encapsulated body 110 is formed from, for example, a material that contains a porous body. The porous body preferably contains a fibrous substance and/or particles. The porous body containing a fibrous substance is, for example, preferably at least one type selected from the group consisting of paper, cotton sheets, polyimide fibers, aramid fibers, polytetrafluoroethylene (PTFE) fibers, glass fibers, rock wool, ceramic fibers and biosoluble inorganic fibers. In addition, the porous body containing particles is, for example, preferably at least one type selected from the group consisting of silica particles, alumina particles, calcium silicate, clay minerals, vermiculite, mica, cement, pearlite, fumed silica and aerogel. Among types of calcium silicate, xonotlite, tobermorite, wollastonite and gyrolite are preferred, and gyrolite is particularly preferred. Principal clay minerals are magnesium silicate, montmorillonite and kaolinite.

In addition, the entire encapsulated body 110 may be formed from a porous body. In the explanations given below, the entire encapsulated body 110 is formed from a porous body and a liquid is held inside cavities in the porous body. It is preferable for the encapsulated body 110 to be elastic so as to be able to respond to pressure. However, the thermal insulation material may, in some cases, not be elastic.

In order to be lightweight, incorporate water and have sufficient strength to be able to maintain good shape retention properties even after water is held therein, the density of the porous body is preferably 200 to 1500 kg/m$^3$, more preferably 250 to 1100 kg/m$^3$, and further preferably 250 to 900 kg/m$^3$. In addition, the thermal conductivity of the porous body is preferably, for example, not more than 0.20 W/(m·K) at 400° C. This thermal conductivity is more preferably not more than 0.15 W/(m·K), and further preferably not more than 0.10 W/(m·K).

[Liquid]

In addition to water, the liquid preferably includes at least one type selected from the group consisting of, for example, alcohols, esters, ethers, ketones, hydrocarbons, fluorine-based compounds and silicone-based oils. It is possible to use one of these or a mixture of two or more types thereof. The liquid preferably contains at least one of a substance that imparts anti-freeze properties (an anti-freeze agent), a preservative and a pH-adjusting agent. There are concerns that water will expand when frozen and cause the outer package material to rupture. Therefore, it is preferable to contain an anti-freeze agent. In addition, depending on the environment, there are concerns that elution of small amounts of components from an inorganic powder during long term storage will lead to changes in the pH of impregnated water and that the inorganic powder, the outer package material, and even the water itself will degenerate. Therefore, it is preferable to contain a pH-adjusting agent. Substances incorporated in the water (additives) are not limited to anti-freeze agents, preservatives and pH-adjusting agents, and other substances may be added according to need.

[Outer Package Body]

The outer package body 120 accommodates the liquid and the encapsulated body 110 in a sealed state. A material made of a resin or metal can be used as the outer package body 120. A laminated product obtained by layering a metal foil and a resin is preferred from the perspectives of high heat resistance and strength. A laminated body having at least three layers, including a resin layer, a metal layer and a resin sealant layer, is preferred as the laminated body of a metal foil and a resin.

Examples of the metal include an aluminum foil, a copper foil, a tin foil, a nickel foil, a stainless steel foil, a lead foil, a tin-lead alloy foil, a bronze foil, an iridium foil and a phosphor bronze foil. In particular, an aluminum foil, a copper foil or a nickel foil is preferred, and an aluminum foil is more preferred.

A thermosetting resin and/or a thermoplastic resin can be used as the resin, but a thermoplastic resin is particularly preferred. Examples of resins include polyethylene, polypropylene, polystyrene, nylon resins, acrylic resins, epoxy resins, polyurethanes, polyether ether ketones, polyethylene terephthalate, polyphenylene sulfide, polycarbonates and aramid resins. In particular, the resin is preferably at least one type selected from among polypropylene, nylon resins and polyethylene terephthalate.

The thickness of the outer package body 120 is not particularly limited, but is, for example, 5 to 200 μm. In the case of the layered product mentioned above, the thickness of the metal foil can be 3 to 50 μm and the thickness of the resin layer can be 2 to 150 μm. Due to this configuration, it is possible to ensure that the heat resistance and low water vapor permeability of the metal foil are achieved and possible to improve sealing properties by means of the resin.

In addition, the outer package body 120 is such that the liquid and the encapsulated body 110 are sealed inside the outer package body 120 by joining edge parts of two outer package bodies in a ring-like shape by means of heat sealing, bonding, or the like. Alternatively, the liquid and the encapsulated body 110 may be sealed by folding one outer package body and bonding the edge part thereof by means of heat sealing, bonding, or the like. The outer package body 120 is preferably flexible (elastic), but may, in some cases, not be flexible.

In the example shown in FIG. 1, the outer package body 120 is provided with a sealing part **120*a* that seals the edge part of the outer package body, and the liquid and the encapsulated body 110 are accommodated in an internal space 111 that is formed in the outer package body 120 by sealing with the sealing part 120*a*. In the example shown in FIG. 1, a gap 120*b* is provided in the internal space 111 between the sealing part 120*a* and the encapsulated body 110. In other words, in a planar view of the front of the partition member 1, the internal space 111 includes a first region S1 in which the outer package body 120 and the encapsulated body 110 overlap and a second region S2 in which the outer package body 120 and the encapsulated body 110 do not overlap. However, the gap 120*b* is not necessarily essential. The gap 120*b* may be in a state whereby inner surfaces of the outer package body 120 are in contact with each other in cases where a fluid (a gas or liquid) is not present therein. Moreover, in the embodiment of the present invention, the volume of the internal space 111 is defined as the product of the area of the internal space 111 and the thickness of the encapsulated body 110**. In addition, the position of the encapsulated body is not necessarily the center of the internal space, and the encapsulated body is not necessarily parallel to the outer package body.

In the embodiment of the present invention, the ratio of a water absorption rate 1, which indicates the water absorption rate when the encapsulated body 110 is compressed for 1 minute at a pressure of 0.05 kgf/cm$^2$, and a water absorption rate 2, which indicates the water absorption rate when the encapsulated body 110 is compressed for 1 minute at a pressure of 5 $kgf/cm^2$ [water absorption rate 2]/[water absorption rate 1] is at least 0.4.

The water absorption rate 1 and the water absorption rate 2 can be determined using, for example, the formulae below.

$$\text{Water absorption rate 1 (\%)}=(m2-m1)/m1\times 100$$

$$\text{Water absorption rate 2 (\%)}=(m3-m1)/m1\times 100$$

Here, m1 denotes the mass (g) of the test piece (encapsulated body) prior to water absorption, m2 denotes the mass (g) of the test piece (encapsulated body) after being compressed at a pressure of 0.05 $kgf/cm^2$ following water absorption, and m3 denotes the mass (g) of the test piece (encapsulated body) after being compressed at a pressure of 5 $kgf/cm^2$ following water absorption.

<Assembled Battery>

An explanation will now be given of an assembled battery in which the partition member 1 is used. Assembled batteries are used in battery packs fitted to, for example, electric vehicles (EV), hybrid electric vehicles (HEV), plug-in hybrid electric vehicles (PHEV), heavy electrical equipment, electric bikes, power-assisted bicycles, ships, aircraft, electric trains, uninterruptible power supplies (UPS), domestic power storage systems, storage battery systems for power system stabilization systems that use renewable energy such as wind power, solar power, tidal power or geothermal energy, and the like. However, assembled batteries can also be used as power sources for supplying electrical power to equipment other than the EVs and the like mentioned above.

[Single Battery]

Figures 3, 4:
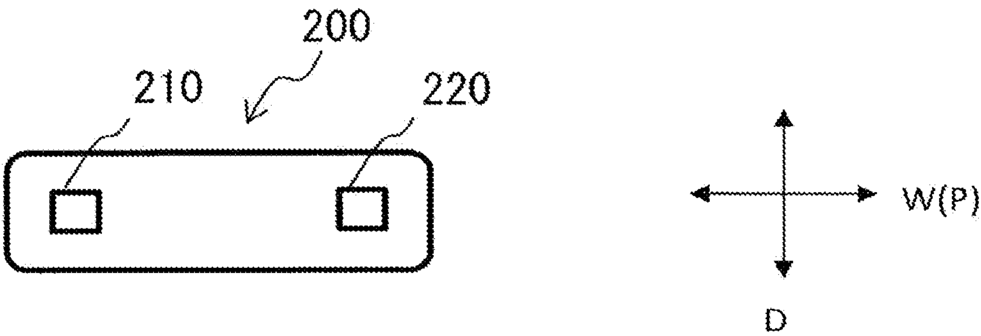
FIG. 3 shows an example of a single battery.
FIG. 4 is a frontal view of the single battery shown in FIG. 3.
Figure 5:
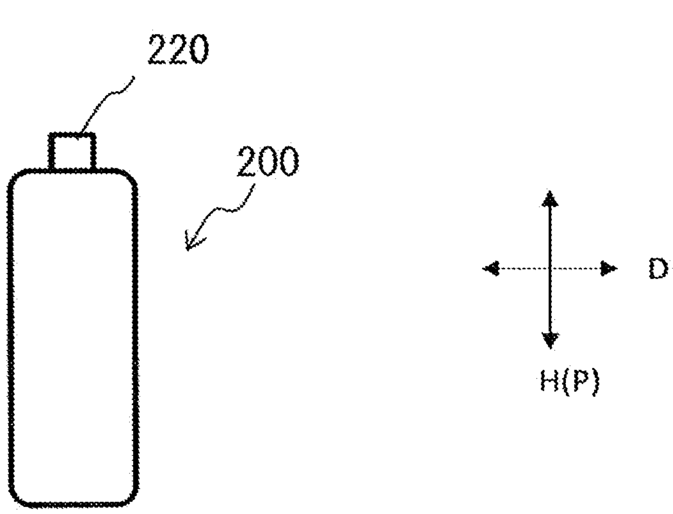
FIG. 5 is a side view of the single battery shown in FIG. 3.

FIG. 3 is a planar view that shows an example of a single battery that constitutes an assembled battery, FIG. 4 is a frontal view of the single battery shown in FIG. 3, and FIG. 5 is a right side view of this single battery. A single battery 200 is formed as a cuboid shape having a height direction (H), a width direction (W) and a thickness direction (D), and a terminal 210 and a terminal 220 are provided on the top surface of the single battery. The single battery 200 is, for example, a lithium ion secondary battery provided with a positive electrode and negative electrode, which are capable of storing and releasing lithium ions, and an electrolyte. In addition to lithium ion secondary batteries, it is possible to use a secondary battery such as a lithium ion all solid state battery, a nickel-metal hydride battery, a nickel-cadmium battery or a lead storage battery.

[Assembled Battery]

Figure 6:
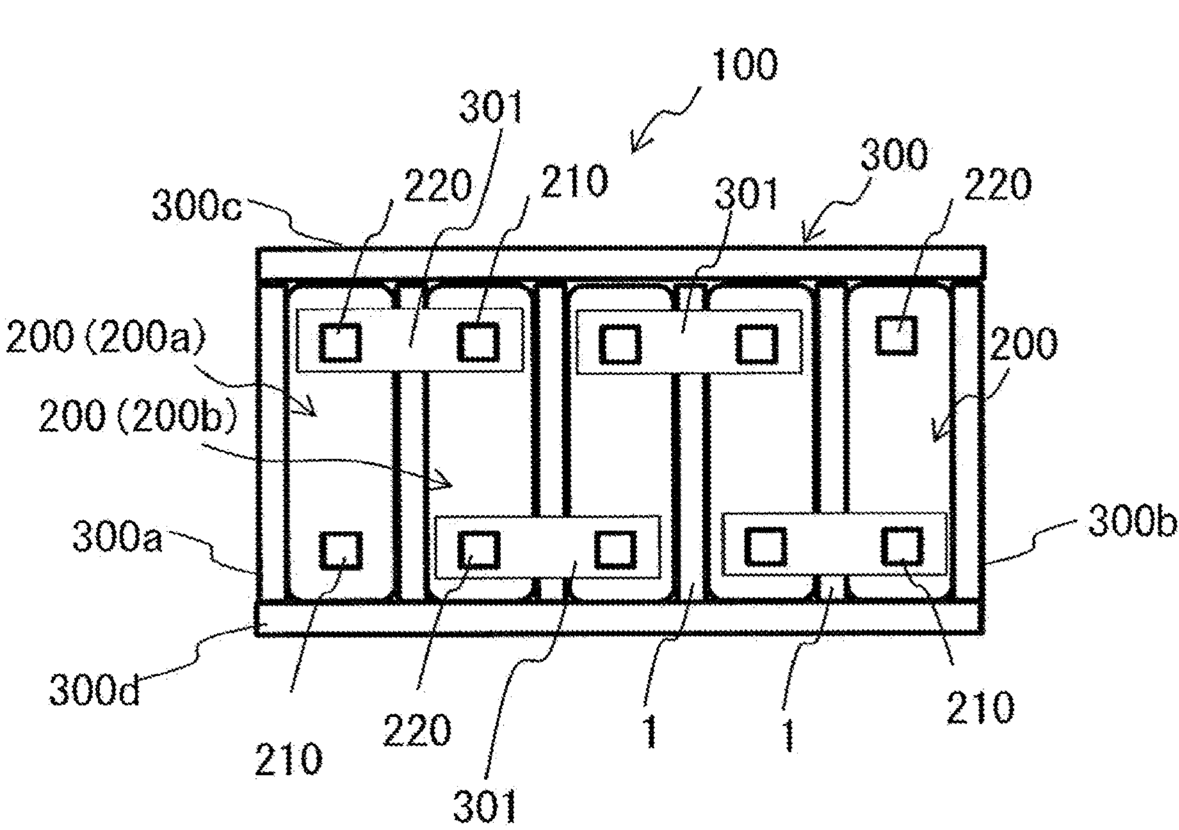
FIG. 6 is a top view that shows an example of an assembled battery.
Figure 7:
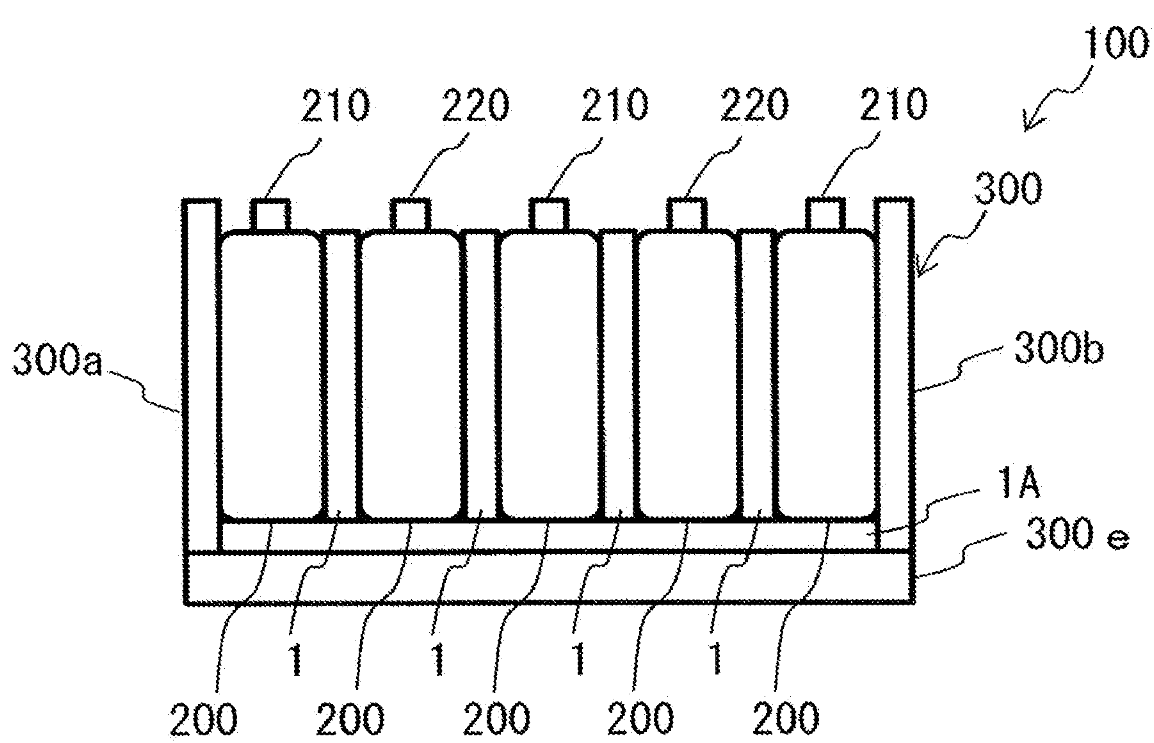
FIG. 7 is a side view that schematically illustrates a side surface of the assembled battery shown in FIG. 6, in a state where a side plate on the front side has been removed.

FIG. 6 shows the top surface of an assembled battery 100 formed using a plurality of single batteries 200, and FIG. 7 is a side view that schematically illustrates a state in which a side plate 300*d* has been removed from the assembled battery 100 shown in FIG. 6. In FIG. 6 and FIG. 7, the assembled battery 100 includes a housing 300 and a plurality of single batteries 200 accommodated inside the housing 300. The housing 300 has a bottom plate 300*e* and side plates 300*a*, 300*b*, 300*c* and 300*d*, which are provided in an upright manner around the periphery of the bottom plate 300*e*. In FIG. 6 and FIG. 7, five single batteries 200 are used as an example, but the number of single batteries can be selected as appropriate.

The plurality of single batteries 200 are arranged in the thickness direction inside the housing 300, and partition members 1 described above are disposed between single batteries 200. The assembled battery 100 outputs electrical power as a result of positive electrode terminals (for example, terminals 210) and negative electrode terminals (for example, terminals 220) of single batteries 200, which are adjacent to (opposite) each other with the partition member 1 disposed therebetween, being electrically connected in series by means of bus bars 301. A partition member 1A is arranged between the bottom plate 300*e* of the housing 300 and the single batteries 200 in the assembled battery 100, as shown in FIG. 7. The partition member 1A has a similar configuration to the partition member 1.

<Heat Generation and Heat Transfer in Assembled Battery>

As a result of some or all of the chemical substances that constitute the electrodes, the electrolyte solution, and the like, of a single battery 200 undergoing decomposition reactions as a result of heat generation inside the single battery 200, the temperature of the single battery 200 may increase and some or all of the regions in the single battery 200 may reach a temperature of at least 200° C. In the embodiment of the present invention, this state is referred to as an "abnormal heat generation state".

In general, it is known that among the materials that constitute the single battery 200, the safety of a positive electrode material is greatly affected by the stability of the crystal structure thereof following delithiation caused by charging. Materials such as $LiCoO_2$, $Li(Ni_{1/3}Mn_{1/3}Co_{1/3})O_2$ and $Li(Ni_{0.8}Co_{0.15}Al_{0.05})O_2$, which are commonly used as positive electrode materials, undergo crystal collapse caused by oxygen release at high temperatures in a charged state. Oxygen released from a positive electrode causes oxidation of an electrolyte solution, and the like, and leads to sudden exothermic reactions. It has been reported that as a result of structural analysis using radiant light, phase transition of crystals occurs at temperatures close to 200° C. in the types of positive electrode material mentioned above. Therefore, in cases where the temperature in some or all of the regions in the single battery 200 reach at least 200° C., crystal collapse progresses in a positive electrode, that is to say, the single battery 200 is in a thermal runaway state (see Reference Document 1: Safety Technologies and Materials for Lithium-ion Batteries, CMC Publishing Co., Ltd., page 44/Reference Document 2: J. Dahn et al., Electrochemistry Communication, 9, pages 2534 to 2540 (2007)/Reference Document 3: Hironori Kobayashi, "*Housya-kou wo Mochiita Lithium ion Niji Denchi You Seikyoku Zairyou no Hyouka-Kaiseki Gijutsu*" (Techniques for evaluation and analysis of positive electrode materials for lithium ion secondary batteries using radiant light), Industrial Users Society of SPring-8, Glass and Ceramics Seminar (2nd) (2011)).

In addition, with regard to the safety of a negative electrode material among the materials that constitute the single battery 200, it is known that a charging negative electrode (a lithium-inserted carbon negative electrode) fundamentally exhibits strong reducing properties similar to those exhibited by lithium metal, and that a coating film is formed on the surface of the negative electrode as a result of a reaction with an electrolyte solution, thereby suppressing further reactions. Therefore, the chemical composition and structure and thermal stability of this protective coating film greatly affect the thermal stability of the charging negative electrode when the temperature increases. It is normally explained that a reaction between a charging negative electrode and an electrolyte solution is caused by formation of a protective coating film and a subsequent explosive reductive decomposition reaction caused by rupture of the coating film. It has been reported that, in general, a protective coating film-forming reaction at a negative electrode progresses from a temperature of approximately 130° C., a subsequent coating film decomposition reaction progresses at a temperature of approximately 200° C., and an explosive reductive decomposition reaction then finally occurs. Therefore, in cases where some or all of the regions in the single battery 200 reach a temperature of at least 200° C., rupture of the coating film at the surface of the negative electrode progresses, that is to say, the single battery 200 is in a state of thermal runaway (see Reference Document 4: "*Denchi Hando Bukku*" (Battery Handbook), Vol. 1, Ohmsha, Ltd., page 591/Reference Document 5: Recent Trends of High Safety and Evaluation Technologies in Lithium Ion Batteries, CMC Publishing Co., Ltd., page 90).

In addition, a state in which chemical substances that constitute the electrodes, the electrolyte solution, and the like, that constitute the single battery 200 have not undergone decomposition reactions caused by at least a certain heat generation rate inside the single battery 200 is referred to as a "normal state" in the embodiment of the present invention. Here, the heat generation state of the single battery 200 can be evaluated using accelerating rate calorimetry (ARC), which is a means for quantitatively measuring thermal behavior when a reactive chemical substance undergoes exothermic decomposition under thermally insulated conditions. For example, Dahn et al. have defined that in cases where the heat generation rate observed in ARC exceeds 0.04° C./min, an auto-exothermic reaction progresses inside a cell, and it is possible to follow this definition (see Reference Document 6: J. Dahn et al., Electrochimica Acta, 49, pages 4599 to 4604 (2004)). In addition, in the embodiment of the present invention, a single battery 200 in a normal state is said to be "a single battery in which a normal state is maintained", and a single battery 200 which has deviated from a normal state and has not reached abnormal heat generation state is said to be "a single battery that has deviated from a normal state". Heat generated inside a single battery 200 is transmitted to other single batteries 200 via a variety of transmission pathways. For example, heat generated inside a single battery 200 can be transmitted to other single batteries 200 via the partition member 1.

For example, the envisaged upper limit for the average surface temperature is 180° C. in cases where a single battery 200 in contact or near-contact with the partition member 1 deviates from a normal state and has not reached an abnormal heat generation state. Here, in cases where commonly used separator materials are made of polyethylene or polypropylene, it is known that the meltdown temperature thereof is 160° C. to 200° C. Therefore, in cases where the average surface temperature of a single battery 200 exceeds 180° C., there are concerns that a part of a commonly used separator material that constitutes the single battery 200 will undergo meltdown and the single battery will reach an abnormal heat generation state.

In a region where the average temperature of one of the two surfaces in the thickness direction of a partition member 1 that forms a partition between single batteries 200 that constitute the assembled battery 100 does not exceed 180° C., the partition member 1 can transmit heat from a single battery 200 (for example, a single battery 200*a*) in the assembled battery 100 in the thickness direction, and transmit the heat to another single battery 200 (for example, a single battery 200*b*) or a member other than a single battery 200 (for example, the bottom plate 300*e*) that faces the single battery 200*a* through the partition member 1. However, in a case where the average temperature exceeds 180° C., the partition member 1 splits as a result of heat, and a liquid held inside is discharged to the outside in the form of a gas or a liquid. As a result of this discharge, air (which exhibits a thermal insulation effect) enters the encapsulated body 110 in the partition member 1, thereby increasing thermal insulation properties (thermal resistance) in the thickness direction. As a result, it is possible to avoid a state in which a given single battery 200 reaching a state that deviates from a normal state leads to another single battery 200 reaching a state that deviates from a normal state.

The envisaged upper limit for the average surface temperature is 80° C. in cases where a single battery 200 in contact or near-contact with the partition member 1 does not deviate from a normal state. Here, the boiling points of commonly used electrolyte solution components are at least 90° C., as shown in Table 1 below. Commonly used electrolyte solution components are, for example, ethylene carbonate (EC), diethyl carbonate, dimethyl carbonate (DMC) and ethyl methyl carbonate (EMC). In cases where the average surface temperature of a single battery 200 is lower than 80° C., a commonly used electrolyte solution per se that constitutes the single battery 200 does not boil. In cases where the average temperature of both surfaces in the thickness direction of the partition member 1 that forms a partition between single batteries that constitute the assembled battery is lower than 80° C., heat transfer in the thickness direction is facilitated by the liquid held inside. Because the heat transfer resistance of the partition member 1 is lower than that of conventional products in cases where all the single batteries 200 that constitute the assembled battery 100 are in a normal state, it is possible to equalize the temperature between single batteries 200 in the assembled battery 100, and an advantageous effect of reducing degradation of single batteries 200 caused by temperature differences can be expected.

In addition, according to the partition member 1 and the assembled battery 100, a material capable of maintaining the water absorption rate even when pressure is applied is used as the material of the encapsulated body 110. As a result, even if pressure is exerted on the partition member 1, the encapsulated body 110 can hold a desired amount of liquid and it is possible to suppress a decrease in thermal conductivity.

Working examples relating to the embodiment of the present invention will now be explained.

Working Example 1

(1) Water Absorption Rate Measurements

Three test pieces measuring 50 mm×50 mm were cut from a vermiculite paper (thickness 2 mm, density 0.85 g/cm$^3$), and the mass was measured. Water was placed in a polypropylene container (volume 1680 mL), and the test pieces were immersed in the water for at least 15 minutes. Next, a test piece was removed from the water, placed between two dried filter papers (No. 514A available from Advantec Toyo Kaisha, Ltd., thickness 0.32 mm, dimensions 150 mm×150 mm), and compressed for 1 minute using a metal plate (SUS430 available from Misumi Group Inc., dimensions 150 mm×100 mm×10 mm, weight 1.3 kg), and the mass of the test piece was measured immediately after the compression was released. The pressure exerted by the 1.3 kg metal plate corresponds to 0.05 kgf/cm$^2$.

Another test piece was removed from the water and placed between another two filter papers, a metal plate and a load cell (RCD-50kN available from Showa Sokki Corporation) were stacked in that order, and the load was adjusted to 125 kg using a clamp press MP-001 (available from AS ONE Corporation). After compressing for 1 minute, the mass of the test piece was measured immediately after the compression was released. The pressure exerted by the clamp press corresponds to 5 kgf/cm$^2$.

The water absorption rates of the test pieces were determined three times using the formulae below, and average values were calculated.

$$[\text{Water absorption rate 1) (\%)}]=(m2-m1)/m1\times100 \quad \text{(formula 1)}$$

$$[\text{Water absorption rate 2 (\%)}]=(m3-m1)/m1\times100 \quad \text{(formula 2)}$$

$$[\text{Water absorption rate ratio}]=[\text{water absorption rate 2}]/[\text{water absorption rate 1}] \quad \text{(formula 3)}$$

Here, m1 is the mass (g) of the test piece prior to water absorption. m2 is the mass (g) is the mass of the test piece after being compressed by a load of 1.3 kg (0.05 kgf/cm$^2$) following water absorption. m3 is the mass (g) is the mass of the test piece after being compressed by a load of 125 kg (5 kgf/cm$^2$) following water absorption.

(2) Thermal Conductivity Measurements

In accordance with the method of Working Example 1 described above, the partition member 1 was obtained by disposing the encapsulated body 110, to which a pressure of 5 kgf/cm$^2$ had been applied, inside a laminated aluminum film (including polyethylene terephthalate as a resin layer (outside) and polyethylene (inside) and having a thickness of 150 μm) as the outer package body 120, and then (tightly) sealing using a vacuum deaeration sealer (FCB-200 available from FUJIIMPULSE Co., Ltd.). The external dimensions of the partition member 1 were a height of 6 cm, a width of 6 cm and a thickness of 2.1 cm.

Next, a heater, a brass plate, a thermal insulation plate A (HIPHA available from Misumi Group Inc., thickness 3 mm), a brass plate, a partition member, a brass plate, a thermal insulation plate B (the same material as thermal insulation plate A), a brass plate and a thermal insulation material C (HIPHA available from Misumi Group Inc., thickness 40 mm) were held and bonded in that order. The load was adjusted to 360 kg from the upper side of the thermal insulation material C using a hydraulic press HYP505H (available from Japan Automatic Machine Co., Ltd.). A load of 360 kg corresponds to a pressure of 10 kgf/cm$^2$.

With the load applied, the heater was heated to a temperature of 80° C., and once the temperature of the heater reached 80° C., heating was continued for 30 minutes. Following completion of the heating, the thickness of the partition member 1 was measured, and the thermal conductivity of the partition member was determined using formula 4 below from the temperature upon completion of heating at positions of the partition member 1 where the film thickness while compressed was determined to be 1.85 mm, the heat conduction resistance from the heater to the partition member 1, and the thickness of the partition member 1 while compressed.

$$k=(\Delta T1\times L)/(\Delta T2\times R) \quad \text{(formula 4)}$$

Here, k: Thermal conductivity [W/(m·K)] of partition member

ΔT1: Temperature difference [K] between high temperature side surface and low temperature side surface of thermal insulation plate A ΔT2: Temperature difference [K] between high temperature side surface and low temperature side surface of partition member L: Thickness [m] of partition member while compressed R: Heat conduction resistance from heater to partition member $5.1\times10^{-3}$ [m$^2$·K/W]

The thermal conductivity 30 minutes after the heater temperature reached 80° C. was 0.45 W/(m·K).

Working Example 2

Test pieces and a partition member 1 were obtained by replacing the vermiculite paper used in Working Example 1 with a thermal insulation sheet (thickness 2 mm, density 0.95 g/cm$^3$) including mainly an inorganic filler, rock wool and wollastonite, and subjected to the same tests as those in Working Example 1 (water absorption rate measurements and thermal conductivity measurements). In Working Example 2, the film thickness while compressed in thermal conductivity measurements was 1.9 mm.

Working Example 3

Test pieces and a partition member 1 were obtained by replacing the vermiculite paper used in Working Example 1 with a heat-resistant sheet (thickness 2 mm, density 0.50 g/cm$^3$) including mainly an alkaline earth silicate and hydrous magnesium silicate, and subjected to the same tests as those in Working Example 1 (water absorption rate measurements and thermal conductivity measurements). In Working Example 3, the film thickness while compressed in thermal conductivity measurements was 1.7 mm.

Comparative Example 1

Test pieces and a partition member were obtained by replacing the vermiculite paper used in Working Example 1 with a material obtained by overlaying two sheets of a rock wool paper having a thickness of 1 mm (density 0.54 g/cm$^3$), and subjected to the same tests as those in Working Example 1 (water absorption rate measurements and thermal conductivity measurements). In Comparative Example 1, the film thickness while compressed in thermal conductivity measurements was 1.6 mm.

Comparative Example 2

Test pieces and a partition member were obtained by replacing the vermiculite paper used in Working Example 1 with a material obtained by overlaying two layers of a ceramic sheet having a thickness of 2 mm (density 0.25 g/cm$^3$), and subjected to the same tests as those in Working Example 1 (water absorption rate measurements and thermal conductivity measurements). In Comparative Example 2, the film thickness while compressed in thermal conductivity measurements was 1.7 mm.

Comparative Example 3

Test pieces and a partition member were obtained by replacing the vermiculite paper used in Working Example 1 with a material obtained by overlaying three sheets of a cotton fiber cloth having a thickness of 0.6 mm (density 0.037 g/cm$^3$), and subjected to the same tests as those in Working Example 1 (water absorption rate measurements and thermal conductivity measurements). In Comparative Example 3, the film thickness while compressed in thermal conductivity measurements was 1.6 mm.

Comparative Example 4

Test pieces and a partition member were obtained by replacing the vermiculite paper used in Working Example 1 with a material obtained by overlaying two layers of aramid fibers having a thickness of 1.3 mm (density 0.044 g/cm$^3$), and subjected to the same tests as those in Working Example 1 (water absorption rate measurements and thermal conductivity measurements). In Comparative Example 4, the film thickness while compressed in thermal conductivity measurements was 2.1 mm.

The results for Working Examples 1 to 3 and Comparative Examples 1 to 4 are shown in Table 2 below.

As explained above, the partition members 1 according to Working Examples 1 to 3 and Comparative Examples 1 to 4 have an outer package body 120 that accommodates an encapsulated body 110 and a liquid. In cases where the value of [water absorption rate 2]/[water absorption rate 1] is at least 0.4, as exhibited by the working examples, favorable thermal conductivity is achieved even after compression. As a result, by using the materials according to Working Examples 1 to 3, for example, in the encapsulated body 110, the encapsulated body 110 favorably holds a liquid even if pressure is exerted on the encapsulated body 110, and it is possible to obtain a partition member 1 and an assembled battery 100 capable of maintaining a desired thermal conductivity.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

TABLE 1

| | | EC | DMC | EMC | DEC |
|---|---|---|---|---|---|
| DENSITY | g/ml | 1.385 | 1.063 | 1.007 | 0.97 |
| MOLECULAR WEIGHT | g/mol | 88.06 | 90.08 | 104.11 | 118.13 |
| BOILING POINT | °C. | 238 | 90 | 108 | 127 |

TABLE 2

| | ENCAPSULATED BODY | WATER ABSORPTION RATE 1 | WATER ABSORPTION RATE 2 | RATE 2/ RATE 1 | THERMAL CONDUCTIVITY [W/(m · K) |
|---|---|---|---|---|---|
| EXAMPLE 1 | VERMICULITE PAPER | 51.0 | 38.9 | 0.76 | 0.45 |
| EXAMPLE 2 | THERMAL INSULATION SHEET | 47.7 | 38.3 | 0.80 | 0.48 |
| EXAMPLE 3 | HEAT-RESISTANT SHEET | 65.8 | 29.6 | 0.45 | 0.45 |
| COMPARATIVE EXAMPLE 1 | ROCK WOOL PAPER | 57.1 | 19.6 | 0.34 | 0.38 |
| COMPARATIVE EXAMPLE 2 | CERAMIC SHEET | 193.2 | 39.2 | 0.20 | 0.39 |
| COMPARATIVE EXAMPLE 3 | COTTON FIBER CLOTH | 105.4 | 29.5 | 0.28 | 0.34 |
| COMPARATIVE EXAMPLE 4 | ARAMID FIBERS | 94.9 | 22.8 | 0.24 | 0.33 |

What is claimed is:

1. An assembled battery, comprising:

a partition member that forms a partition between single batteries that constitute the assembled battery or between a single battery and a member other than the single battery, wherein the partition member comprises:

an encapsulated body capable of retaining a liquid; and an outer package body having an internal space for accommodating the liquid and the encapsulated body in a sealed state, wherein the ratio of a water absorption rate 2 to a water absorption rate 1, [water absorption rate 2]/[water absorption rate 1], is at least 0.4, where the water absorption rate 1 indicates the water absorption rate when the encapsulated body is compressed for 1 minute at a pressure of 0.05 kgf/cm$^2$, and the water absorption rate 2 indicates the water absorption rate when the encapsulated body is compressed for 1 minute at a pressure of 5 kgf/cm$^2$, wherein the encapsulated body is formed from a material that contains a porous body, wherein the porous body contains a fibrous substance and inorganic particles, wherein the partition member has a thickness direction and a planar direction that is orthogonal to the thickness direction, the planar direction is comprised of a length and a width of the partition member, wherein the length and width of the partition member form a plane that extends between single batteries or between a single battery and a member other than the single battery, and wherein when the partition member positioned between single batteries or between a single battery and a member other than the single battery is viewed from a width direction, a height of the partition member from a bottom to top of the partition member does not protrude higher than a maximum height of a top surface of the single batteries, and when the partition member is viewed from a top direction, a length of the partition member from a front to back direction does not extend longer than a maximum length of the single batteries in the front to back direction.

2. The assembled battery according to claim 1, wherein the outer package body is a laminated body of a metal foil and a resin.

3. The assembled battery according to claim 2, wherein the metal foil is at least one type selected from an aluminum foil, a copper foil, a tin foil, a nickel foil, a stainless steel foil, a lead foil, a tin-lead alloy foil, a bronze foil, a silver foil, an iridium foil and phosphor bronze.

4. The assembled battery according to claim 2, wherein the resin is a thermoplastic resin.

5. The assembled battery according to claim 1, wherein the particles of the porous body are selected from the group consisting of silica particles, alumina particles, calcium silicate, clay minerals, vermiculite, mica, cement, pearlite, fumed silica and aerogel.

6. The assembled battery according to claim 1, wherein a density of the porous body is between 200 $kg/m^3$ and 1500 $kg/m^3$.

7. The assembled battery according to claim 1, wherein a thermal conductivity of the porous body is not more than 0.20 W/(m·K) at 400° C.

8. The assembled battery according to claim 1, wherein the outer package body includes an opening.

9. The assembled battery according to claim 8, wherein the opening is formed by heat.

10. The assembled battery according to claim 8, wherein heat conductivity is decreased by an encapsulated liquid flowing out of the opening in a vapor phase state or a liquid phase state.

11. The assembled battery according to claim 1, wherein a height of the partition member is less than or equal to a height of the single battery, and wherein a direction of the heightis orthogonal to the thickness direction and parallel to a short side direction of a spacer.

12. The assembled battery according to claim 1, wherein the partition member is rectangular, and wherein the periphery of the plane formed by the partition member between single batteries or between a single battery and a member other than the single battery, is sealed.

13. The assembled battery according to claim 1, wherein the outer package body includes a laminated body having at least three layers including a resin layer, a metal layer, and a resin sealant layer, and wherein between single batteries or between a single battery and a member other than the single battery, a periphery of two laminated bodies or one folded laminated body is sealed.

* * * * *